(12) United States Patent
Park et al.

(10) Patent No.: US 11,395,395 B2
(45) Date of Patent: Jul. 19, 2022

(54) SYSTEM AND METHOD FOR DRIVING MULTI-FUNCTIONAL LED LAMP BASED ON SINGLE CHANNEL

(71) Applicants: HYUNDAI MOTOR COMPANY, Seoul (KR); KIA CORPORATION, Seoul (KR); SL CORPORATION, Daegu (KR)

(72) Inventors: Choong Seob Park, Suwon-si (KR); Jin Hyun Kim, Suwon-si (KR); So Jeong Kang, Seoul (KR); Chul Sung Lee, Gyeongsan-si (KR); Ga Hee Lee, Gyeongsan-si (KR)

(73) Assignees: HYUNDAI MOTOR COMPANY, Seoul (KR); KIA CORPORATION, Seoul (KR); SL CORPORATION, Daegu (KR)

( * ) Notice: Subject to any disclaimer, the term of this patent is extended or adjusted under 35 U.S.C. 154(b) by 0 days.

(21) Appl. No.: 17/369,176

(22) Filed: Jul. 7, 2021

(65) Prior Publication Data

US 2022/0117063 A1 Apr. 14, 2022

(30) Foreign Application Priority Data

Oct. 13, 2020 (KR) .................. 10-2020-0131932

(51) Int. Cl.
*H05B 47/10* (2020.01)
*H05B 47/16* (2020.01)
*B60Q 1/00* (2006.01)
*H05B 45/54* (2020.01)
*H05B 45/44* (2020.01)

(52) U.S. Cl.
CPC ............. *H05B 47/16* (2020.01); *H05B 45/44* (2020.01); *H05B 45/54* (2020.01); *B60Q 1/00* (2013.01)

(58) Field of Classification Search
CPC ...... H05B 45/10; H05B 45/30; H05B 45/325; H05B 45/48; H05B 45/52; H05B 45/54; H05B 47/10; H05B 47/16; B60Q 1/0094; B60Q 1/2696; B60Q 1/00; B60Q 1/04; B60Q 1/1461; B60Q 11/00; B60Q 11/005
See application file for complete search history.

(56) References Cited

U.S. PATENT DOCUMENTS

| 2008/0116818 A1* | 5/2008 | Shteynberg | ............ H05B 45/24 315/192 |
|---|---|---|---|
| 2008/0191642 A1* | 8/2008 | Slot | ........................ H05B 47/16 315/295 |

(Continued)

*Primary Examiner* — Thai Pham
(74) *Attorney, Agent, or Firm* — McDonnell Boehnen Hulbert & Berghoff LLP

(57) ABSTRACT

A system for driving a multi-functional light emitting diode (LED) lamp includes a first light source group and a second light source group classified depending on lamp functions, a single LED lamp driving device to regulate an input voltage to a voltage necessary for each lamp function and to apply the voltage to the first light source group and the second light source group, a switching device to control an On/Off state of the first light source group and the second light source group, and a control device to time-division control a time to turn on/off the switching device by internetworking with the LED lamp driving device and to control a light quantity of the first light source group and the second light source group.

18 Claims, 12 Drawing Sheets

(56) References Cited

U.S. PATENT DOCUMENTS

| | | | |
|---|---|---|---|
| 2015/0173133 A1* | 6/2015 | Seki | H05B 45/54 |
| | | | 315/185 R |
| 2016/0255687 A1* | 9/2016 | Zhang | H05B 45/20 |
| | | | 315/210 |
| 2017/0006670 A1* | 1/2017 | Lasaffre | B60Q 1/1415 |
| 2018/0035502 A1* | 2/2018 | Raniero | H05B 45/10 |
| 2020/0187329 A1* | 6/2020 | Ichikawa | B60Q 1/1415 |

\* cited by examiner

SYSTEM AND METHOD FOR DRIVING MULTI-FUNCTIONAL LED LAMP BASED ON SINGLE CHANNEL

CROSS REFERENCE TO RELATED APPLICATIONS

This application claims the benefit of priority to Korean Patent Application No. 10-2020-0131932, filed in the Korean Intellectual Property Office on Oct. 13, 2020, the entire contents of which are incorporated herein by reference.

TECHNICAL FIELD

The present disclosure relates to a system for driving a multi-functional light emitting diode (hereinafter, referred to as a "LED") lamp, based on a single channel, and a method for the same, and more particularly relates to a technology of time-division controlling a multi-functional LED lamp.

BACKGROUND

In general, a vehicle has various vehicle lamp devices having a lighting function of easily identifying an object positioned around the vehicle and a signal function for notifying the driving state of the vehicle to another vehicle or a road user, when driving at nighttime. For example, a headlight and a fog light of vehicle lamps are for lighting functions, and a turn signal, a brake light, and a position lamp of the various vehicle lamps are for signal functions.

Such vehicle lamps include a plurality of LEDs. When the plurality of LEDs is simultaneously driven, the LED difference makes a current difference under the same voltage, such that the LEDs are different from each other in brightness.

Thus, when operating the plurality of LEDs, a constant current driving manner is used rather than a constant voltage driving manner. In particular, when the brightness needs to be finely adjusted, the constant current driving manner is more preferred.

FIG. 1 is a view schematically illustrating the configuration of a power supply for driving a conventional LED.

Referring to FIG. 1, a conventional system for driving a multi-functional LED lamp may include an integral central control unit (ICU) 11, a micro-computer 12, an LED driver 13, and an LED load 14.

The ICU 11 may provide a lamp driving signal to the micro-computer 12 through an intelligent power switch (IPS), and may provide power to the LED driver 13.

The micro-computer 12 may receive the lamp driving signal from the IPS and may control a constant current through the LED driver 13.

The LED driver 13, which is a DC-DC driving semiconductor, may be arranged corresponding to each lamp function. In this case, the LED load 14 may be arranged to be connected to each LED driver.

The LED driver 13 may receive power from the IPS, and may receive a control signal from the microcomputer 12 to control a constant current of the LED and to diagnose the fault.

In other words, the IPS in the ICU (SJB) serves to supply the control signal and power of the lamp, while detecting the disconnection and the short circuit of the wiring. In addition, the ICU 11 may receive information on failures (open or short) of a low beam and a turn signal from the microcomputer 12 through a separate Tell-Tale wiring circuit for each lamp function.

In the conventional system for driving a multi-functional LED lamp, a system price is increased due to redundant LED drivers 13 for each lamp function and the use of an expensive IPS.

SUMMARY

The present disclosure has been made to solve the above-mentioned problems occurring in the prior art while advantages achieved by the prior art are maintained intact.

An aspect of the present disclosure provides a system for driving a multi-functional LED lamp, capable of time-division controlling a plurality of LED lamps, based on a single channel to minimize the price of the system, and a method for the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a system for driving a multi-functional light emitting diode (LED) lamp may include a first light source group and a second light source group classified depending on lamp functions, a single LED lamp driving device to regulate an input voltage to a voltage necessary for each lamp function and to apply the voltage to the first light source group and the second light source group, a switching device to control an On/Off state of the first light source group and the second light source group, and a control device to time-division control a time to turn on/off the switching device by internetworking with the LED lamp driving device and to control a light quantity of the first light source group and the second light source group.

According to an embodiment, the first light source group and the second light source group may be connected with each other in parallel.

According to an embodiment, each of the first light source group and the second light source group may include a LED or a structure in which at least two LED is connected in series.

According to an embodiment, the switching device may include a first switch connected with a first LED group, which performs a first function, of the first light source group in parallel to control an On/Off state of the first LED group, a second switch connected with a second LED group, which performs a second function, of the first light source group in parallel to control an On/Off state of the second LED group, and a third switch connected with a third LED group, which performs a third function, of the first light source group in parallel to control an On/Off state of the third LED group.

According to an embodiment, the switching device may include a first switch connected with an output terminal of the LED lamp driving device and an input terminal of the first light source group, and a second switch connected with the output terminal of the LED lamp driving device and an input terminal of the second light source group.

According to an embodiment, the first function may include a low beam function, the second function includes a high beam function, and the third function includes a sub-high beam function, and the second light source group may perform a daytime running lamp (DRL) function or a positioning lamp function.

According to an embodiment, the LED lamp driving device may drop the input voltage when a DRL function is turned on and applies the input voltage to the second light source group.

According to an embodiment, the LED lamp driving device may boost the input voltage when a high beam function is turned on and applies the input voltage to the first light source group.

According to an embodiment, the LED lamp driving device may boost or drop the input voltage depending on a difference between the input voltage and a voltage necessary to perform the low beam function when the low beam function is turned on, and applies the input voltage to the first light source group.

According to an embodiment, the LED lamp driving device may include a first switching device and a second switching device connected with each other in series between an input voltage terminal and a ground terminal, a third switching device and a fourth switching device connected with each other in series between an output voltage terminal and the ground terminal, and an inductor connected between a common node of the first switching device and the second switching device and a common node of the third switching device and the fourth switching device.

According to an embodiment, the control device may control the second light source group to be turned off when the first light source group is turned on, and control the first light source group to be turned off when the second light source group is turned on.

According to an embodiment, the first light source group may include a plurality of LED groups depending on functions, and the control device may control the switching device to turn on the LED groups from an LED group having a highest duty rate.

According to an embodiment, the control device may set a duty rate (DUTY) for turning on the first light source group to be longer than a duty rate for turning on the second light source group.

According to an embodiment, the control device may calculate an output current value applied to the first light source group or the second light source group, based on the duty rate for turning on the first light source group or the second light source group and a maximum output current.

According to an embodiment, the system may further include an input-terminal capacitor to stabilize an input current, an output-terminal capacitor to stabilize an output current, and a comparative capacitor to discharge a charged current.

According to an embodiment, the control device may determine that a fault of an LED load of at least one of the first light source group or the second light source group is caused by an open state (open-circuit) when an output current from the single LED lamp driving device is equal to or less than a specific numeric value.

According to an embodiment, the control device may determine that a fault of an LED load of at least one of the first light source group or the second light source group is caused by a short state (short circuit), when a differential voltage applied across opposite terminals of each of a plurality of LED groups in the first light source group or a differential voltage applied across opposite terminals of the second light source group is less than a specific numeric value.

According to an embodiment, the control device may perform a fail-safe action in which a faulted LED group is excluded, when the faulted LED group is present in the first light source group or the second light source group.

According to another aspect of the present disclosure, a method for driving a multi-functional LED lamp, may include regulating and outputting a voltage applied to a first light source group and a second light source group classified depending on lamp functions, and controlling an On/Off state and a light quantity of the first light source group and the second light source group, by time-division controlling a time for turn on/off a switching device connected with the first light source group and the second light source group in a time-division manner.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
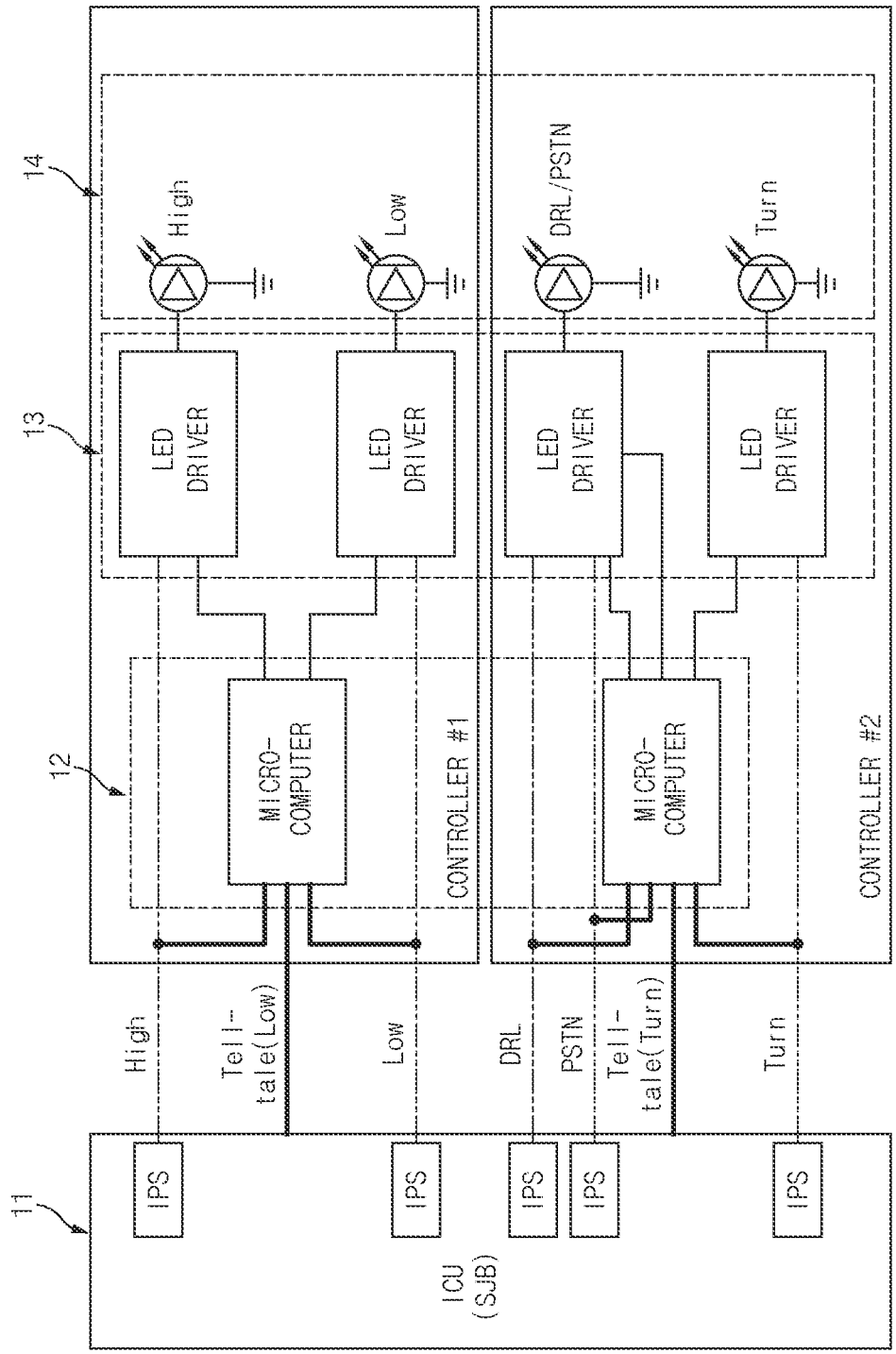
FIG. 1 is a view schematically illustrating a configuration of a conventional power supply for driving an LED.

Hereinafter, some embodiments of the present disclosure will be described in detail with reference to accompanying drawings. In adding the reference numerals to the components of each drawing, it should be noted that the identical or equivalent component is designated by the identical numeral even when they are displayed on other drawings. In addition, in the following description of an embodiment of the present disclosure, a detailed description of well-known features or functions will be ruled out in order not to unnecessarily obscure the gist of the present disclosure.

In describing the components of the embodiment according to the present disclosure, terms such as first, second, A, B, (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 2 to 9.

A headlamp of a vehicle includes a lamp having multiple functions (High, Low, Turn, DRL, Fog, or the like), which include, in detail, functions of a low beam, a High beam, a daytime running lamp (hereinafter, referred to as a "DRL"), a positioning lamp (or tail lamp; hereinafter, referred to as a "PSTN"), and a sub-high beam (hereinafter, referred to as "SUB"). The low beam and the high beam are to allow a driver to ensure a visual field in front. The DRL is automatically turned on regardless of the operation of a switch by a user and regardless of whether the driver drives at daytime or nighttime only if a vehicle is started and is in a driving state, to prevent traffic accidents by promoting the safety between vehicles in countries having a lot of fog and a humid climate. The PSTN is an indicating lamp mounted in a front portion of a vehicle.

The present disclosure discloses a configuration to control a multi-functional LED lamp applied to a headlamp of the vehicle by using a single LED lamp driver, and to control an On/Off state and a light quantity of the multi-functional LED lamp through the time-division control.

Figure 2:
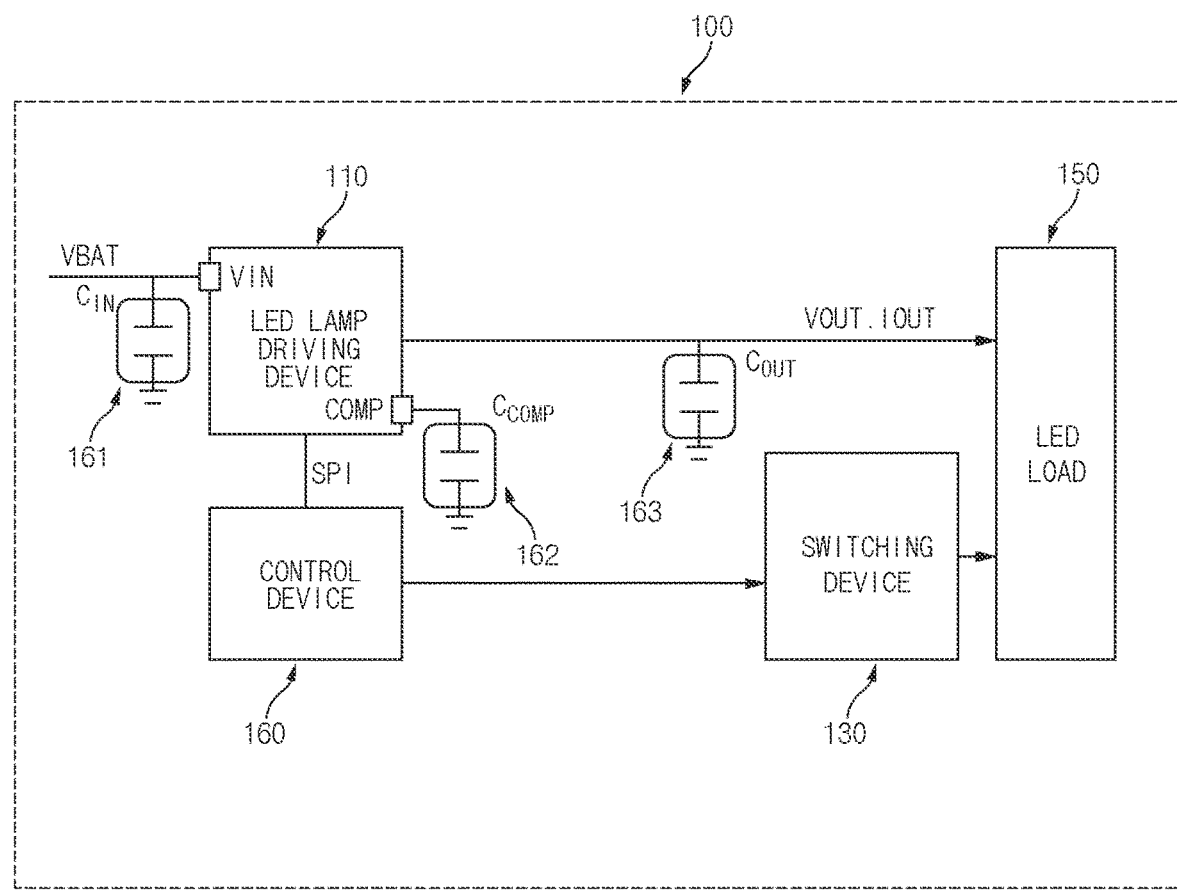
FIG. 2 is a block diagram illustrating a configuration of a vehicle system including a system for driving a multi-functional LED lamp based on a single channel, according to an embodiment of the present disclosure.
Figure 3A:
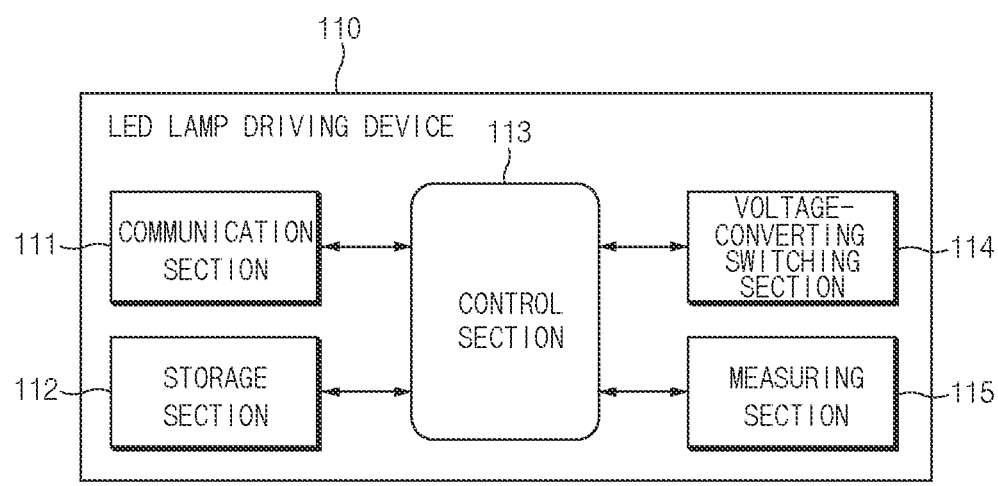
FIG. 3A is a view illustrating a detailed configuration of an LED lamp driving device of FIG. 2.
Figure 3B:
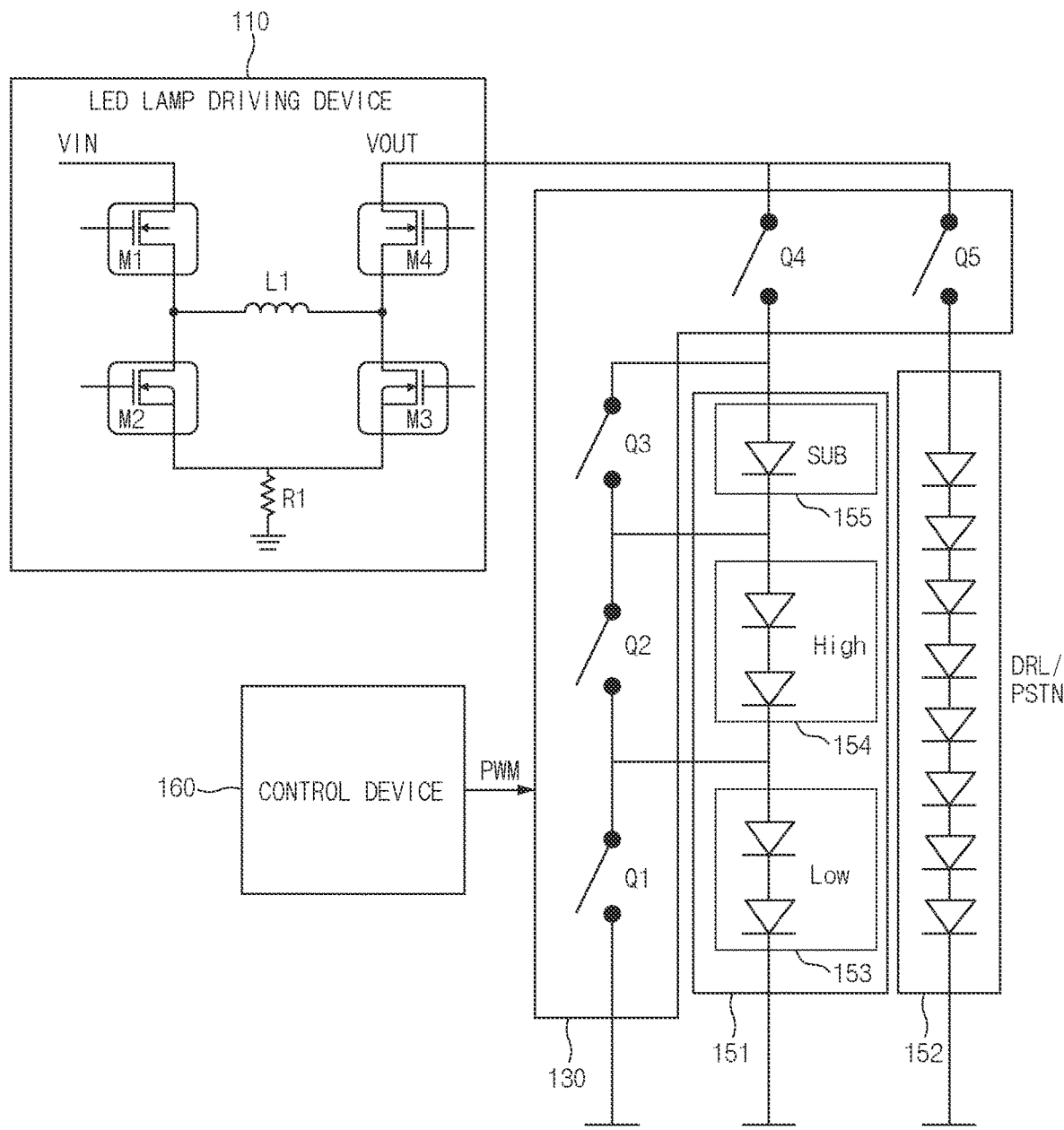
FIG. 3B illustrates a detailed circuit diagram of each component of FIG. 2.

FIG. 2 is a block diagram illustrating the configuration of a vehicle system including a system for driving a multi-functional LED lamp based on a signal channel, according to an embodiment of the present disclosure, FIG. 3A is a view illustrating a detailed configuration of an LED lamp driving device of FIG. 2, and FIG. 3B is a view illustrating detailed circuits of each component of FIG. 2.

According to an embodiment of the present disclosure, a system 100 for driving a multi-functional LED lamp may be implemented in a headlamp inside a vehicle. In this case, the system 100 for driving the multi-functional LED lamp may be implemented integrally with internal control units of the vehicle. Alternatively, the system 100 for driving the multi-functional LED lamp may be implemented separately from the internal control units of the vehicle and may be connected with the internal control units of the vehicle through an additional connection unit.

Referring to FIG. 2, the system 100 for driving the multi-functional LED lamp may include an LED lamp driving device 110, a switching device 130, an LED load 150, a control device 160, an input-terminal capacitor 161, a comparative capacitor 162, and an output-terminal capacitor 163.

The LED lamp driving device 110 turns on or off a lamp, which has a specific function, of multi-functional lamps, or regulates (boosts or drops) an input voltage, which is a voltage of a vehicle battery, to a voltage necessary for each function and provides the regulated voltage to the LED load 150, when adjusting a light quantity.

The LED lamp driving device 110 may control a plurality of lamps through a single component by utilizing a high-speed switch (DC-DC) LED driving semiconductor. The LED lamp driving device 110 may boost or drop a voltage depending on a voltage necessary for each function of an LED lamp. For example, when the DRL function of multi-functions becomes in an On state, the LED lamp driving device 110 drops an input voltage and provides the input voltage to a lamp to perform the DRL function. When a high beam function (hereinafter, referred to as "High") becomes in an On state, the LED lamp driving device 110 boosts an input voltage and provides the boosted voltage to an LED lamp to perform the high beam function. When a low beam function (hereinafter, referred to as "Low") becomes in an On state, the LED lamp driving device 110 boosts or drops an input voltage depending on a level of the input voltage and provides the boosted or dropped input voltage to an LED lamp to perform a low beam function. A configuration and a method for converting a voltage to a voltage necessary for each lamp function in the LED lamp driving device 110 will be described below in more detail with reference to FIGS. 4A to 4C.

As illustrated in FIG. 3A, the LED lamp driving device 110 may include a communication section 111, a storage section 112, a control section 113, a voltage-converting switching section 114, and a measuring section 115.

The communication section 111 may allow the LED lamp driving device 110 to have in-controller communication with the control device 160 based on a vehicle network communication technology such as a serial peripheral interface (SPI).

For example, the communication section 111 may be in communication with the control device 160, and may transmit a voltage value or an output current value, which is measured by the measuring section 115, of the LED load 150 to the control device 160. Accordingly, the control device 160 may determine the fault of the LED load 150 using the voltage value or the current value of the LED load 150, which is received through the communication section 111. In addition, the communication section 111 may receive an output value of a target voltage or a target current from the control device 160. The determination on the failure will be described in more detail with reference to FIGS. 7 and 8.

The storage section 112 may store data and/or algorithms executed by the control section 113. In addition, the storage section 112 may include at least one storage medium of a memory in a flash memory type, a hard disk type, a micro type, the type of a card (e.g., a Security Digital (SD) card or an eXtreme Digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, or an optical disk-type memory.

The control section 113, which may control the operation of each component, may be electrically connected with the communication section 111, the storage section 112, the voltage-converting switching section 114, and the measuring section 115, and may electrically control each component. In addition, the control section 113 may be an electric circuit that executes software commands. Accordingly, the control section 113 may process and calculate various data to be described below.

The voltage-converting switching section 114 may drop or boost an input voltage VIN depending on a driving mode of the headlamp and may output the input voltage VIN to the LED load 150.

Figure 4A:
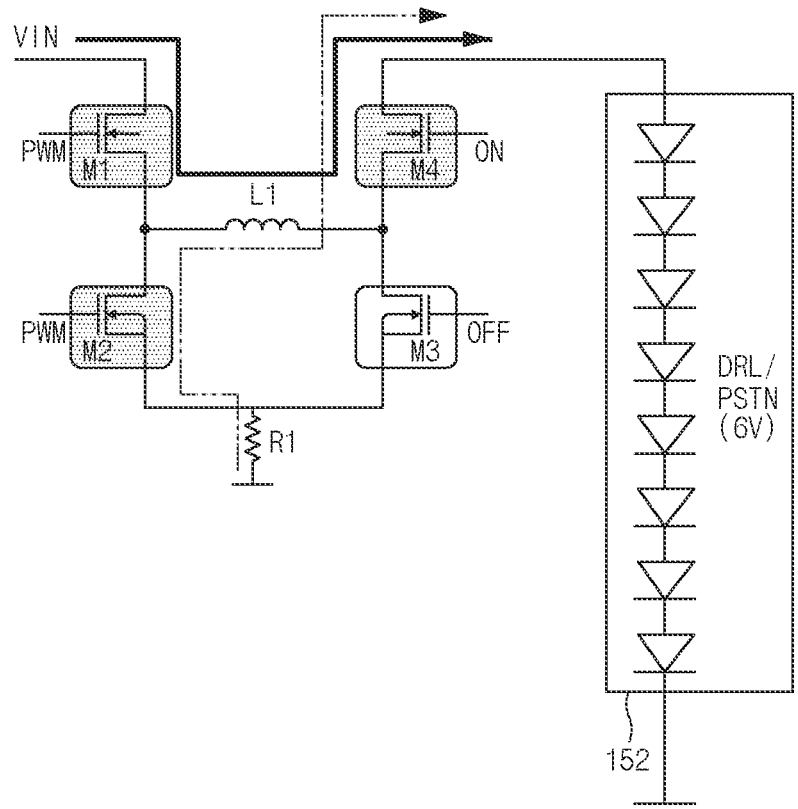
FIGS. 4A, 4B, and 4C are views illustrating driving modes of a system for driving a multi-functional LED lamp, according to an embodiment of the present disclosure.
Figure 4B:
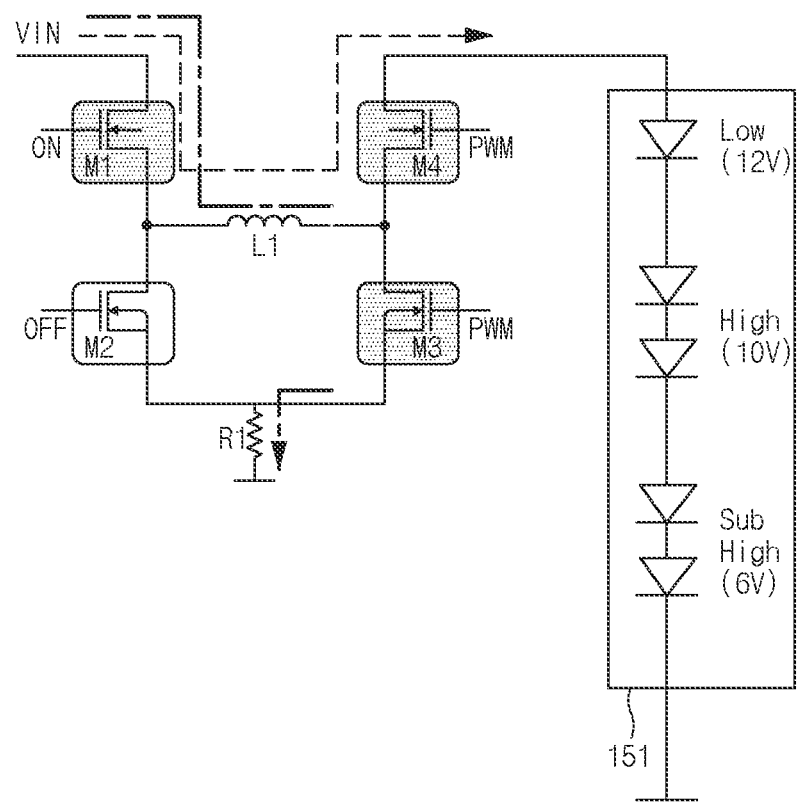
Figure 4C:
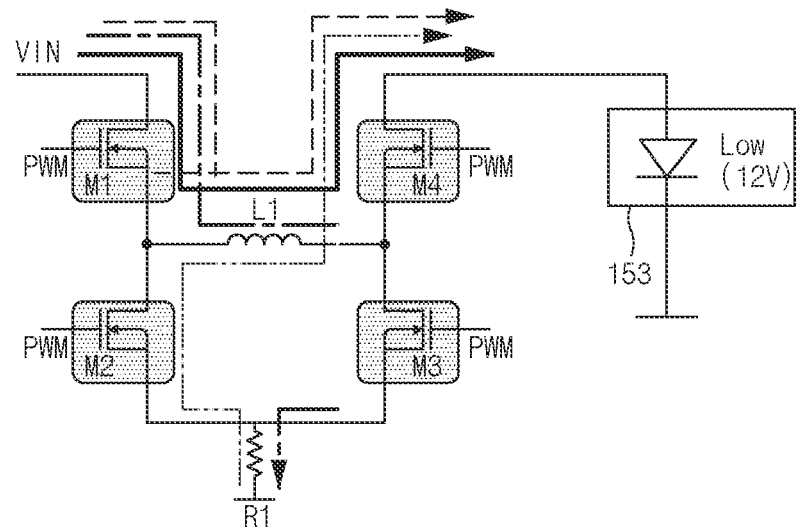

To this end, the voltage-converting switching section 114 includes transistors M1, M2, M3, M4, an inductor L1, and a resistor R1, as illustrated in FIGS. 4A to 4C. FIGS. 4A to 4C are views illustrating driving modes of a system for driving a multi-functional LED lamp, according to an embodiment of the present disclosure.

As illustrated in FIG. 4A, when the driving mode of the headlamp is a DRL mode, the voltage-converting switching section 114 may drop (buck) a voltage and output the dropped voltage to an LED device 152. For example, when the input voltage is in the range of 9 V to 16 V (vehicle battery voltage), the voltage-converting switching section 114 may drop the voltage to 6V to turn on the DRL and output the voltage of 6V. To this end, when a clock cycle begins in the state that the transistor M4 is constantly maintained turned on and a transistor M3 is maintained turned off, as the transistor M2 becomes turned on, the current of the inductor L1 is reduced. During the remaining clock cycle, the transistor M2 is turned off and the transistor M1 is turned on again, so the inductor L1 is charged with a current.

In addition, when the driving mode of the headlamp is a high beam mode as illustrated in FIG. 4B, the voltage-converting switching section 114 may boost a voltage and may output the voltage to the LED group 154 to perform the high beam function.

For example, when the input voltage is 9 V to 16V, which is the vehicle battery voltage, the voltage-converting switching section 114 may boost the input voltage to 28 V in total and provide the boosted voltage to the LED load 150, such that the LED groups 153, 154, and 155 are turned on. To this end, when the clock cycle begins in the state that the transistor M1 is constantly turned on and the transistor M2 is constantly turned off, the transistor M3 is turned on such that the input current is charged in the inductor L1. Then, when the transistor M3 is turned off and the transistor M4 is turned on during the remaining clock cycle, the current charged in inductor L1 is reduced.

In addition, when the driving mode of the headlamp is a low beam mode as illustrated in FIG. 4C, the voltage-converting switching section 114 may boost or drop (Buck-boost) an input voltage depending on the level of the input voltage and may output the input voltage to the LED group 153 to perform the low beam function.

For example, when the input voltage is in the range of 9 V to 16 V, the voltage-converting switching section 114 may boost or drop the input voltage to the voltage of 12 V for driving in the low beam mode. To this end, all switches of the transistors M1 to M4 may operate to be matched with switching frequencies.

The voltage-converting switching section 114 may include an H-bridge that is able to drop or boost an output voltage depending on an On/Off state of the LED for each function, and the H-bridge may be a synchronous driving H-bridge.

As illustrated in FIG. 3B, output terminals of switches Q4 and Q5 connected with each other in parallel may be connected with a first light source group 151 and a second light source group 152.

The switch Q5 may adjust a light quantity of the second light source group 152 by changing a duty rate. In this case, when the first light source group 151 is turned on, the second light source group 152 is turned off. When the second light source group 152 is turned on, the first light source group 151 is turned off. The measuring section 115 may measure a voltage applied across the LED load 150. In other words, the measuring section 115 may measure a voltage applied across opposite terminals of the LED device for each function, which is provided in the LED load 150. In this case, the measuring section 115 may employ the configuration of a typical voltage or current meter.

The switching device 130 includes a plurality of switches Q1, Q2, Q3, Q4, and Q5 which are turned on and off by the control device 160. The operations of the switches Q1, Q2, Q3, Q4, and Q5 of the switching device 130 will be described later with reference to following table 1 and FIG. 9.

The LED load 150 may include a plurality of LED strings which receive DC power from the LED lamp driving device 110 and emit light. The LED load 150 of FIG. 1 may include the first light source group 151 and the second light source group 152 connected with each other in parallel as illustrated in FIG. 3B.

The first light source group 151 may include LED groups 155, 154, and 153 operating with functions of SUB, High, and Low. The second light source group 152 may have the structure in which a plurality of LED devices operating with functions of DRL/PSTN are connected with each other in series. In this case, each of the LED groups 155, 154, and 153 may include a LED device or at least one LED device having series-connection, the first light source group 151 includes the LED groups 155, 154, and 153 connected with each other in series and controlled to be turned on or turned off depending on the On/Off of the switching module 130, and the second light source group 152 may include a plurality of LED devices performing the functions of "DRL/PSTN" and connected with each other in series.

The first light source group 151 and the second light source group 152 may not be simultaneously turned on. Accordingly, the control device 160 controls the switches Q1 to Q5 provided in the switching module 130 in a time-division manner to control LEDs, which are necessary to be simultaneously controlled, in the first light source group 151 and the second light source group 152, thereby producing an effect of simultaneously turning on the first light source group 151 and the second light source group 152. In this case, the LED groups 153, 154, and 155 in the first light source group 151 may be sequentially turned on from an LED having the highest duty rate.

Figure 9:
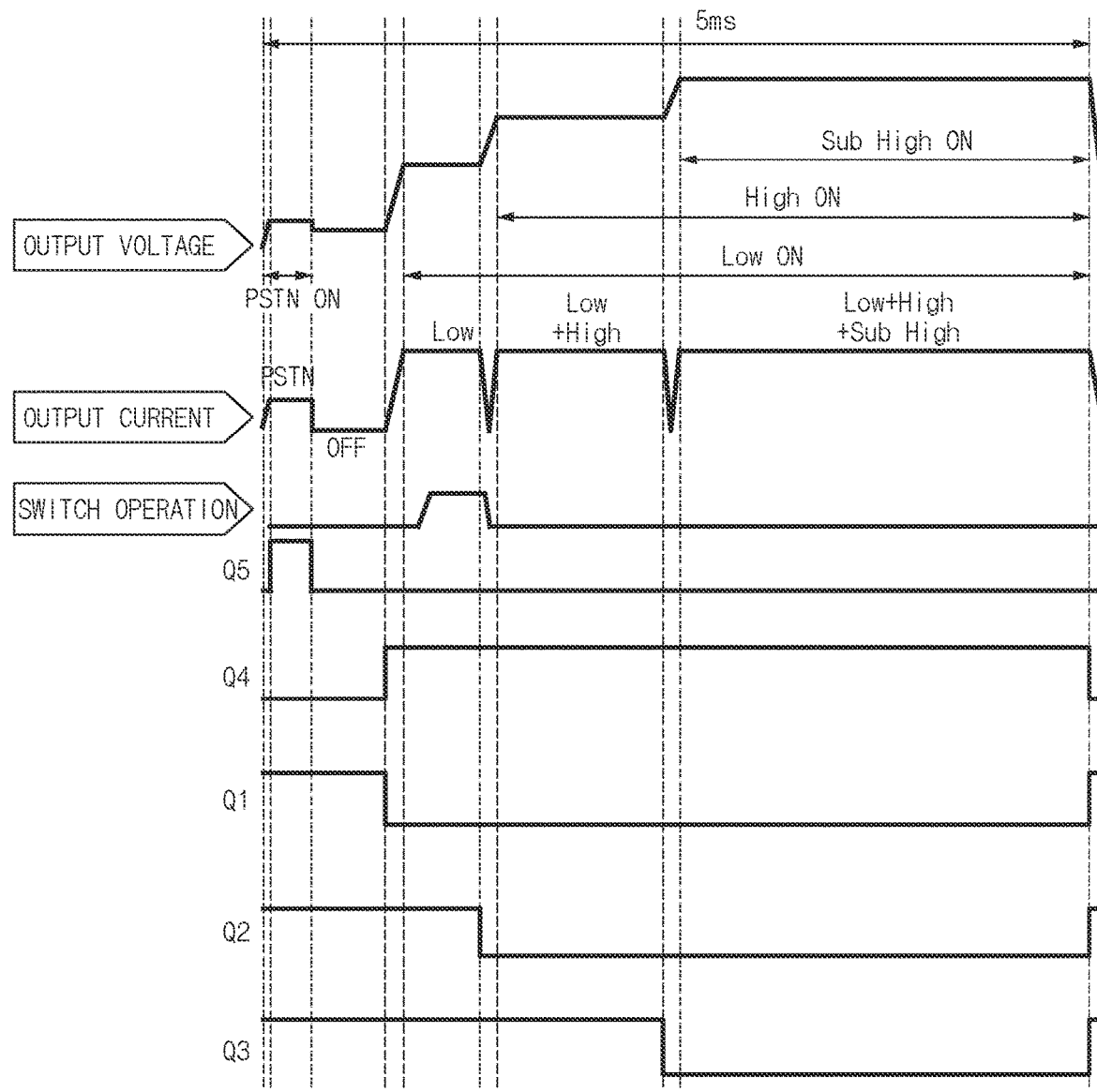
FIG. 9 is a view illustrating time-division timing of a system for driving a multi-functional LED lamp, according to an embodiment of the present disclosure.

Table 1 below shows an example of an LED voltage level for each headlamp function and a switch operation. FIG. 9 is a view illustrating time-division timing of a system for driving a multi-functional LED lamp, according to an embodiment of the present disclosure.

TABLE 1

| Headlamp function | Led voltage | Switch operation | | | | |
|---|---|---|---|---|---|---|
| | | Q1 | Q2 | Q3 | Q4 | Q5 |
| Low | 12 V | Off | On | On | On | Off |
| High | 10 V | On | Off | On | On | Off |
| Sub-high | 6 V | On | Off | Off | On | Off |
| DRL/PSTN | 6 V | — | — | — | Off | On |

Referring to Table 1 and FIG. 9, the plurality of switches Q1, Q2, and Q3 are function switches connected with each other in series, to control applying a current to the LED groups 153, 154, and 155 having functions of SUB, High, and Low. The switches Q1, Q2, and Q3 are connected with the LED groups 153, 154, and 155 in parallel to perform a by-pass function. In addition, the switches Q1, Q2, and Q3 may control light quantities of the LED groups 153, 154, and 155 by changing duty rates. When all switches Q1, Q2, and Q3 are closed, that is, turned on, a current flows to the ground terminal through the switches Q1, Q2, and Q3, and the current is not applied to the first light source group 151. Accordingly, the LED groups 153, 154, and 155 are turned off.

Meanwhile, since the switches Q4 and Q5 are enable switches, the switches Q4 and Q5 may not be simultaneously turned on. In other words, the first light source group 151 and the second light source group 152 may not be simultaneously turned on.

Accordingly, when the switch Q1 is turned off and the switches Q2 and Q3 are turned on in the state that the switch Q5 is turned off, and the switch Q4 is turned on, the current flows to the LED group 153, so the LED group 153 having the function of Low is turned on. In addition, when the switch Q2 is turned off and remaining switches Q1 and Q3 are turned on in the state that the switch Q5 is turned off and the switch Q4 is turned on, the current flows through the LED group, such that the LED group 154 having the high beam function is turned on.

Accordingly, when the switch Q3 is turned off and the switches Q1 and Q2 are turned on, in the state that the switch Q5 is turned off, and the switch Q4 is turned on, the current flows to the LED group 155, so the LED group 155 having the function of SUB is turned on.

As illustrated in FIG. 3B, output terminals of switches Q4 and Q5 connected with each other in parallel may be connected with the first light source group 151 and the second light source group 152, respectively.

The switch Q5 may adjust a light quantity of the second light source group 152 by changing a duty rate. In this case, when the first light source group 151 is turned on, the second light source group 152 is turned off. When the second light source group 152 is turned on, the first light source group 151 is turned off. The control device 160 may process a signal transmitted between components of the system 100 for driving a multi-functional LED lamp. The control device 160 may be, for example, an electronic control unit (ECU), a micro controller unit (MCU), or another lower-level controller mounted in the vehicle.

Figure 5:
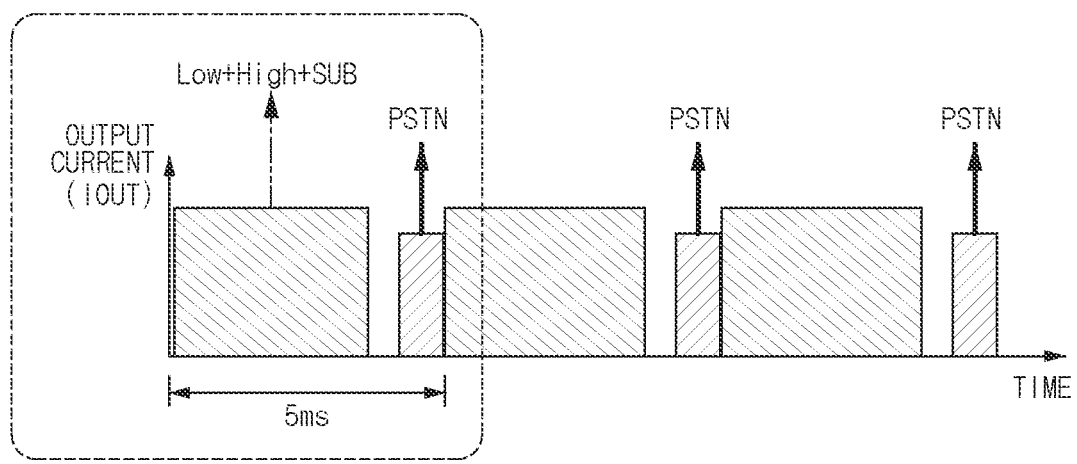
FIGS. 5 and 6 are views illustrating the concept of controlling the driving of a multi-functional LED lamp, according to an embodiment of the present disclosure.
Figure 6:
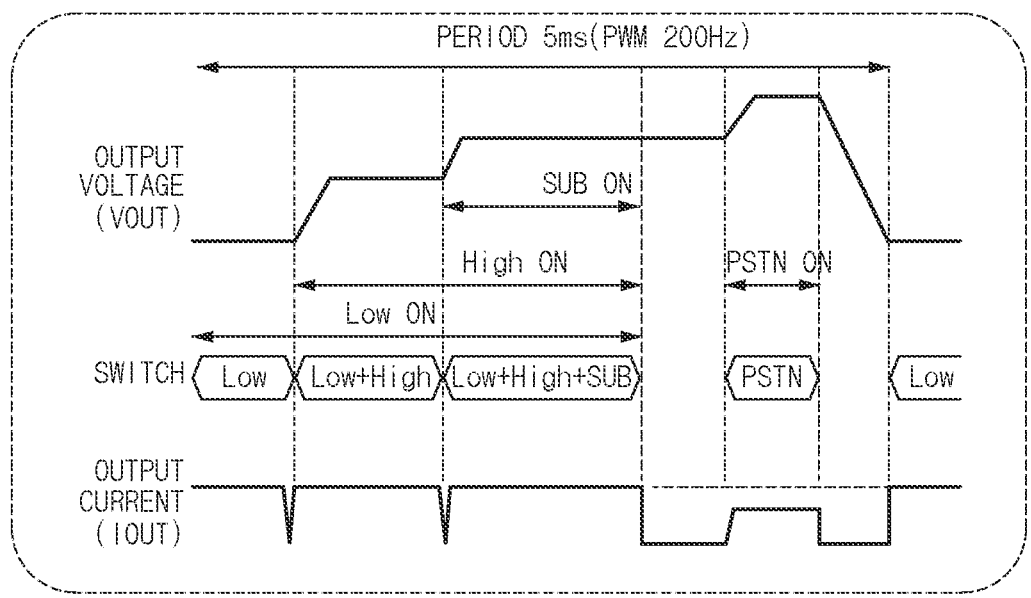

The control device 160 may control the On/Off state of the switching device 130 in a time-division manner and may control the LED load 150. The control device 160 may perform the control operation by dividing one period of an output signal PWM by a specific duty rate. FIGS. 5 and 6 are views illustrating the concept of controlling the driving of a multi-functional LED lamp, according to an embodiment of the present disclosure. Referring to FIGS. 5 and 6, it may be recognized that the control operation is performed by setting one period to 5 ms.

The control device 160 may perform a control operation such that the second light source group 152 is turned off when the first light source group 151 is turned on, and such that the first light source group 151 is turned on when the second light source group 152 is turned on. The control device 160 may control a current not to be applied to the second light source group 152 when selecting the first light source group 151.

The control device 160 may control the switching device 130 to sequentially turn on LED groups from an LED group having the highest duty rate, as the first light source group 151 includes LED groups for a plurality of functions.

The control device 160 may set the duty rate for turning on the first light source group 151 to be longer than the duty rate for turning on the second light source group 152. In other words, the duty rate for turning on the first light source group 151 is different from the duty rate for turning on the second light source group 152. Since the high beam function or the low beam function of the first light source group 151 requires a higher current value than that of the function of DRL/PSTN, the duty rate for turning on the first light source group 151 is set to be longer than the duty rate for turning on the second light source group 152 such that a required current is provided.

The control device 160 may calculate an output current value applied to the first light source group 151 or the second light source group 152 based on the duty rate for turning on the first light source group 151 or the second light source group 152 and the maximum output current.

Referring to FIG. 9, the control device 160 may turn on or turn off the switches Q1, Q2, Q3, Q4, and Q5 through a time-division control operation.

In other words, when the switch Q5 is turned on, and remaining switches Q1 to Q4 are turned off, the LED lamp driving device applies a voltage (for example, the voltage of 6V) for the DRL/PSTN to the second light source group 152 to turn on the second light source group 152. Thereafter, when the switch Q4 is turned on, the switch Q5 is turned off, the switch Q1 is turned off, and remaining switches Q2 and Q3 are turned on, the second light source group 152 is turned off and the first LED group 153 is turned on to perform the low beam function. In this case, the LED lamp driving device 110 outputs an output voltage of 12 V to turn on the first LED group 153.

When the switch Q4 is maintained turned on and the switch Q5 is maintained turned off in the state that the first LED group 153 is turned on, and when the switch Q2 is turned off and only the switch Q3 is turned on in the state that the switch Q1 is turned off, the second LED group 154 is turned on in the state that the first LED group 153 is turned on, such that the high beam function and the low beam function may be simultaneously performed. In this case, the LED lamp driving device 110 outputs the output voltage of 220 V to turn on the first LED group 153 and the second LED group 154.

Thereafter, when the switch Q4 is maintained turned on and the switch Q5 is maintained turned off in the state that the first LED group 153 and the second LED group 154 are turned on, and when all the switches Q1, Q2, and Q3 are turned off, the first LED group 153, the second LED group 154, and the third LED group 155 are all turned on, such that the low beam function, the high beam function, and the sub-high beam function are simultaneously performed. In this case, the LED lamp driving device 110 outputs the output voltage of 28 V to turn on the first LED group 153, the second LED group 154, and the third LED group 155.

Eventually, as the first LED group 153 is first turned on, the second LED group 154 is secondly turned on, and the third LED group 155 is finally turned on, the switches Q1, Q2, and Q3 in the switching device 130 are sequentially turned off. Accordingly, although the switches Q1, Q2, and Q3 are turned off at different time points, the switches Q1, Q2, and Q3 are turned on at the same time point.

The first light source group 151 and the second light source group 152 have mutually different duty rates, and output currents applied to the first light source group 151 and the second light source group 152 may be calculated depending on duty rates as shown in Equation 1.

$$\text{LED current} = \text{Maximum STRING output current value} \times \text{duty rate} \qquad \text{Equation 1}$$

In this case, the control device 160 controls the switches Q4 and Q5 provided at upper portions of the first light source group 151 and the second light source group 152 to prevent the first light source group 151 and the second light source group 152 from being simultaneously turned on.

In addition, the control device 160 may make communication with the LED lamp driving device 110 to control a current, to determine a failure, and to perform a fail-safe action based on the determined failure.

Figure 7:
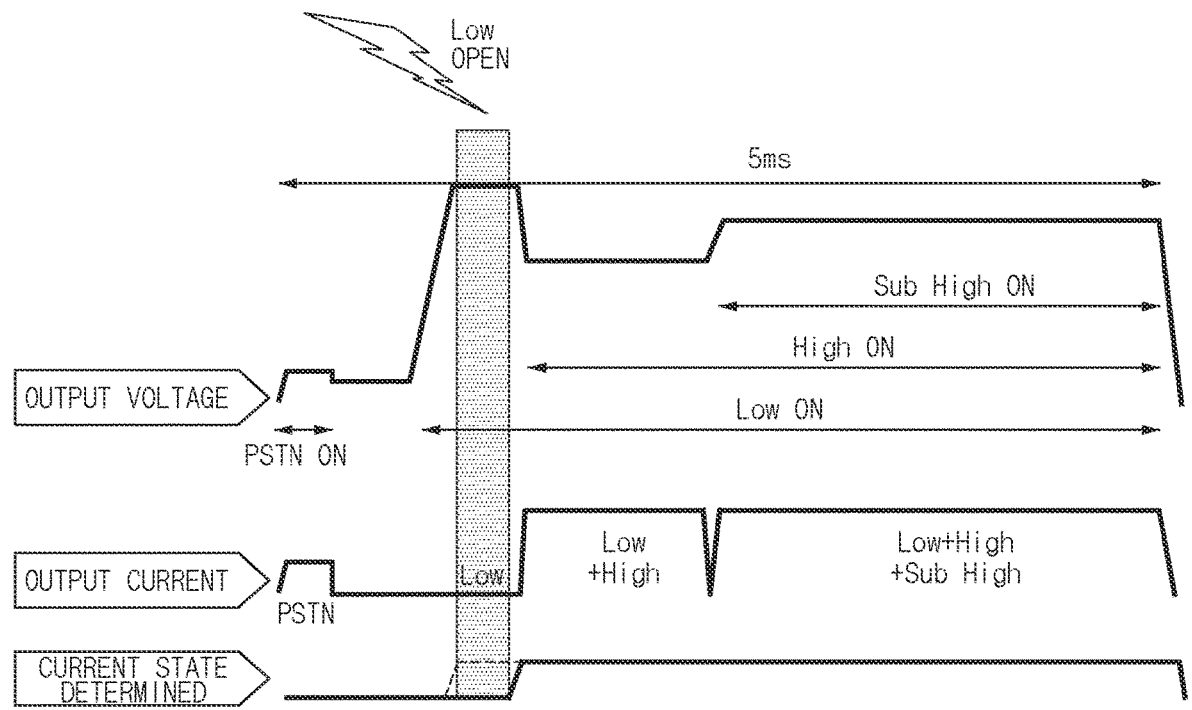
FIGS. 7 and 8 are views illustrating a method for determining a fault of a system for driving a multi-functional LED lamp and a fail-safe action, according to an embodiment of the present disclosure.
Figure 8:
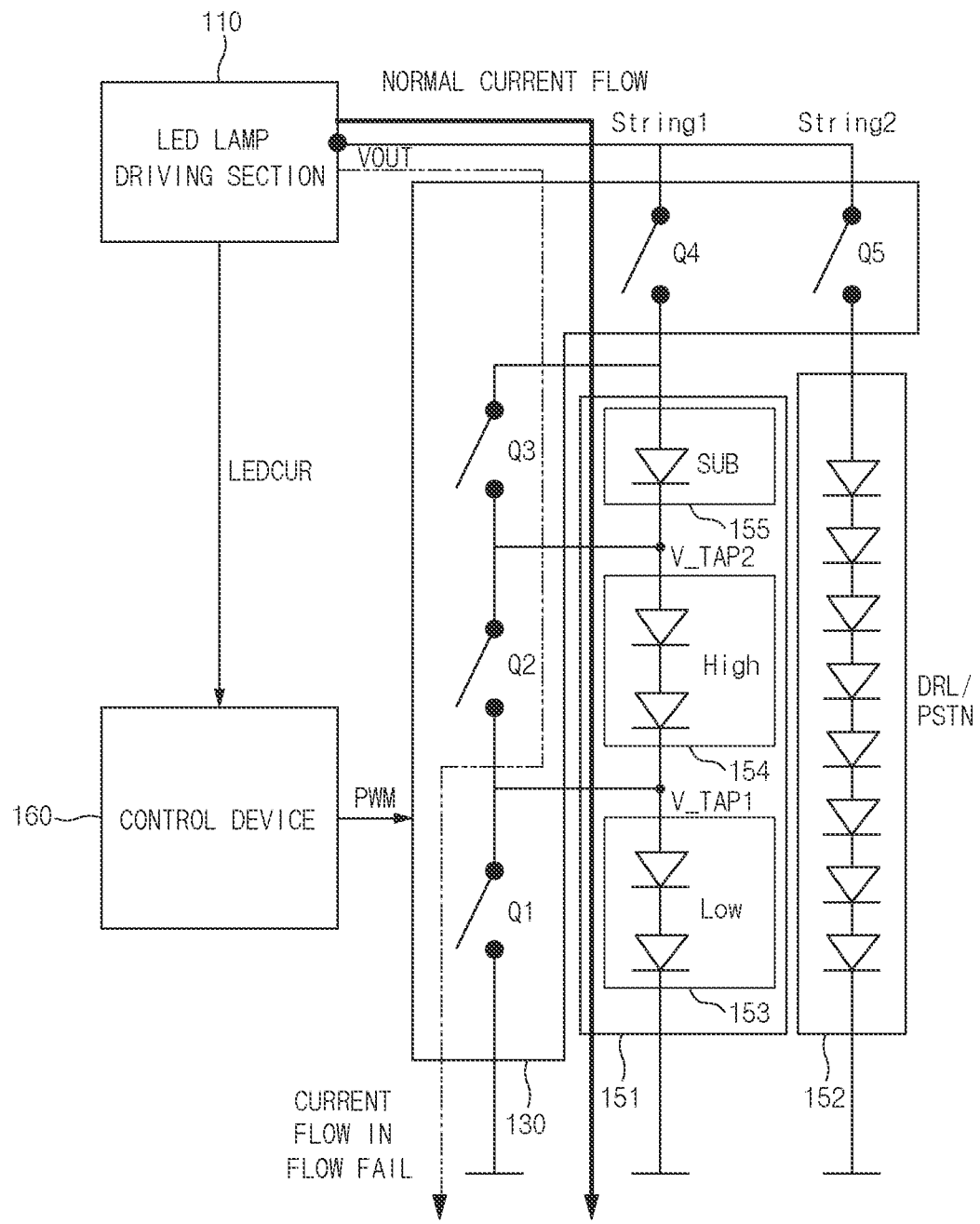

The control device 160 may determine the LED load 150 as be in an open state (open-circuited), when the output current value output from the single LED lamp driving module 110 is equal to or less than 50% of the target current value. For example, when the LED group 153 performing the low beam function is open, the open state is determined depending on whether a current is output, as the output voltage of the LED lamp driving device 110 is largely increased and the output current of the LED lamp driving device 110 is reduced as illustrated in FIG. 7. FIGS. 7 and 8 are views illustrating a method for determining a fault of the system 100 for driving a multi-functional LED lamp and a fail-safe action, according to an embodiment of the present disclosure.

The control device 160 may determine whether a short circuit occurs by identifying the differential voltage applied across opposite terminals of each of the LED groups 153, 154, and 155 for functions. For example, when the differential voltage between voltages V_TAP1 and V_TAP2 at opposite terminals of the LED group 154 performing the high beam function is less than a preset voltage (e.g., 2 V), the control device 160 may determine the LED group 154 as being a short circuit.

When the fault of the LED load 150 is determined as described above, the control device 160 may perform a by-pass function by operating remaining LED devices without the LED device disabled due to the fault. For example, as illustrated in FIG. 8, when the LED group 153 performing the low beam function is faulted, the control device 160 may operate remaining LED groups 154 and 155 without the LED group 153.

In addition, when the states of the switches Q1 to Q3 are changed, a switch off duration may be set, and the control device 1320 controls a switch having a next function after currents charged in the output-terminal capacitor 163 and the comparative capacitor 162 are sufficiently discharged, thereby preventing the current from being overshot or undershot.

The input-terminal capacitor 161 is interposed between a fuse box (not illustrated) and the LED lamp driving device 110 to stabilize an input current.

The comparative capacitor 162 may be interposed between the LED lamp driving device 110 and the ground terminal, especially, between the control section 113 and the ground terminal, thereby rapidly performing a comparison operation.

The output-terminal capacitor 163 may be interposed between the voltage-converting switching section 114 and the LED load 150 to perform an operation for stabilizing the output current of the LED lamp driving device 110.

As described above, according to the present disclosure, multi-functional LEDs may be driven using a single channel, that is, a single LED lamp driving device, and the switching module 130 is time-division controlled to control an On/Off state of the plurality of LEDs.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

As described above, according to the present disclosure, the plurality of LED lamps is time-division controlled based on a single channel, thereby minimizing the increase in the system price.

Besides, a variety of effects directly or indirectly understood through the disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A system for driving a multi-functional light emitting diode (LED) lamp, the system comprising:
    a first light source group and a second light source group, the first light source group and the second light source group each being classified depending on lamp functions;
    a single LED lamp driving device configured to regulate an input voltage to a voltage necessary for each lamp function, and to apply the voltage to the first light source group and the second light source group;
    a switching device configured to control an On/Off state of the first light source group and the second light source group; and
    a control device configured to time-division control a time for turn on or off the switching device by internetworking with the LED lamp driving device, and configured to control a light quantity of the first light source group and the second light source group;
    wherein the first light source group includes a plurality of LED groups depending on functions, and each of the LED groups includes a switch; and
    wherein the control device is configured to control the switching device to sequentially turn on a switch having a highest duty rate among the switch of each of the LED groups.

2. The system of claim 1, wherein the first light source group and the second light source group are connected in parallel.

3. The system of claim 2, wherein each of the first light source group and the second light source group includes a LED or a structure in which at least two LED is connected in series.

4. The system of claim 3, wherein the switching device includes:
    a first switch connected with a first LED group, which performs a first function of the first light source group in parallel to control an On/Off state of the first LED group;
    a second switch connected with a second LED group, which performs a second function of the first light source group in parallel to control an On/Off state of the second LED group; and
    a third switch connected with a third LED group, which performs a third function of the first light source group in parallel to control an On/Off state of the third LED group.

5. The system of claim 4, wherein the first function includes a low beam function, the second function includes a high beam function, and the third function includes a sub-high beam function, and
    wherein the second light source group performs a daytime running lamp (DRL) function or a positioning lamp function.

6. The system of claim 3, wherein the switching device includes:
a first switch connected with an output terminal of the LED lamp driving device and an input terminal of the first light source group; and
a second switch connected with the output terminal of the LED lamp driving device and an input terminal of the second light source group.

7. The system of claim 1, wherein the LED lamp driving device drops the input voltage when a DRL function is turned on and applies the input voltage to the second light source group.

8. The system of claim 1, wherein the LED lamp driving device boosts the input voltage when a high beam function is turned on and applies the input voltage to the first light source group.

9. The system of claim 1, wherein the LED lamp driving device boosts or drops the input voltage depending on a difference between the input voltage and a voltage necessary to perform a low beam function when the low beam function is turned on, and applies the input voltage to the first light source group.

10. The system of claim 1, wherein the LED lamp driving device includes:
a first switching device and a second switching device connected in series between an input voltage terminal and a ground terminal;
a third switching device and a fourth switching device connected in series between an output voltage terminal and the ground terminal; and
an inductor connected between a common node of the first switching device and the second switching device, and a common node of the third switching device and the fourth switching device.

11. The system of claim 1, wherein the control device is configured to:
turn off the second light source group when the first light source group is turned on; and
turn off the first light source group when the second light source group is turned on.

12. The system of claim 1, wherein the control device is configured to:
set a duty rate for a plurality of switches connected to the first light source group to be longer than a duty rate for a switch connected to the second light source group.

13. The system of claim 1, wherein the control device is configured to:
calculate an output current value applied to the first light source group or the second light source group, based on a duty rate for a plurality of switches connected to the first light source group or a switch connected to the second light source group and a maximum output current.

14. The system of claim 1, further comprising:
an input-terminal capacitor configured to stabilize an input current;
an output-terminal capacitor configured to stabilize an output current; and
a comparative capacitor configured to discharge a charged current.

15. The system of claim 1, wherein the control device is configured to:
determine that a fault of an LED load of at least one of the first light source group or the second light source group is caused by an open-circuit when an output current from the single LED lamp driving device is equal to or less than a predetermined value, using a current information received from the LED lamp driving device.

16. The system of claim 1, wherein the control device is configured to:
determine that a fault of an LED load of at least one of the first light source group or the second light source group is caused by a short-circuit when a differential voltage applied across opposite terminals of each of a plurality of LED groups in the first light source group or a differential voltage applied across opposite terminals of the second light source group is less than a predetermined value, using a current information received from the LED lamp driving device.

17. The system of claim 1, wherein the control device is configured to:
perform a fail-safe action in which a faulted LED group is excluded when the faulted LED group is present in the first light source group or the second light source group, wherein the fail-safe action includes bypassing by operating the remaining LED group except for the faulted LED group.

18. A method for driving a multi-functional LED lamp, the method comprising: regulating and outputting a voltage applied to a first light source group and a second light source group, the first light source group and the second light source group each being classified depending on lamp functions; and controlling an On/Off state and a light quantity of the first light source group and the second light source group by time-division controlling a time for turn on or off a switching device connected with the first light source group and the second light source group, wherein the first light source group includes a plurality of LED groups depending on functions, and each of the LED groups includes a switch; wherein the controlling an On/Off state and a light quantity of the first light source group and the second light source group include controlling the switching device to sequentially turn on a switch having a highest duty rate among the switch of each of the LED groups.

* * * * *